United States Patent [19]

Michel

[11] 3,941,099

[45] Mar. 2, 1976

[54] STEAM GENERATOR ASSEMBLY FOR PRESSURIZED WATER REACTORS WITH A STRAIGHT TUBE BUNDLE AND A PARTIAL FLOW PREHEATER TRAVERSIBLE BY PRESSURIZED WATER

[75] Inventor: Rupprecht Michel, Erlangen, Germany

[73] Assignee: Kraftwerk Union Aktiengesellschaft, Mulheim (Ruhr), Germany

[22] Filed: Aug. 26, 1974

[21] Appl. No.: 500,346

[30] Foreign Application Priority Data
Aug. 29, 1973 Germany............................ 2343576

[52] U.S. Cl................................ 122/32; 122/406 R
[51] Int. Cl.²....................... F22B 1/06; F22D 7/00
[58] Field of Search............. 122/32, 33, 34, 406 R, 122/407

[56] References Cited
UNITED STATES PATENTS

| 2,704,534 | 3/1955 | Dalin et al. | 122/407 |
| 2,796,050 | 6/1957 | Rehm | 122/32 |
| 3,596,638 | 8/1971 | Michel | 122/32 |
| 3,771,497 | 11/1973 | Sprague et al. | 122/32 |

Primary Examiner—Kenneth W. Sprague
Attorney, Agent, or Firm—Herbert L. Lerner

[57] ABSTRACT

To reduce the temperature difference between a straight tube bundle and the housing surrounding the same in a steam generator assembly for pressurized water reactors, a preheater for feed water is provided, and part of the pressurized water, after it has flowed through the heat exchanger or steam generator proper, is used for heating the feedwater in the preheater.

3 Claims, 1 Drawing Figure

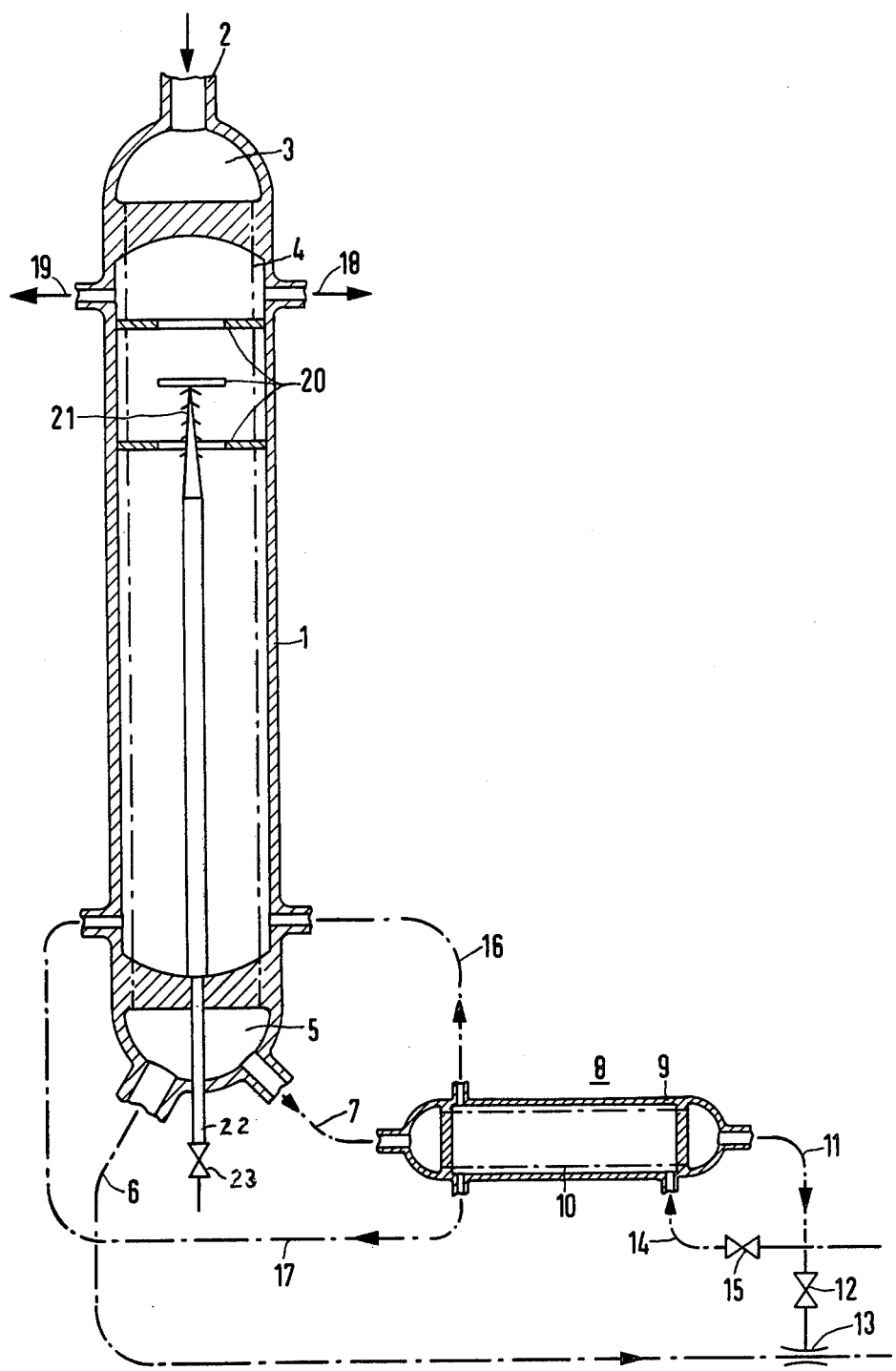

STEAM GENERATOR ASSEMBLY FOR PRESSURIZED WATER REACTORS WITH A STRAIGHT TUBE BUNDLE AND A PARTIAL FLOW PREHEATER TRAVERSIBLE BY PRESSURIZED WATER

The invention relates to a steam generator assembly for pressurized water nuclear reactors having a straight tube bundle and a partial flow preheater traversible by pressurized water.

Generally, steam generators having a U-shaped tube bundle traversible by pressurized water and welded with inlet and outlet tubes into a common tube sheet are employed for pressurized water reactors. The inlet half of such a tube sheet has a temperature that is 30° to 35°C greater than that of the outlet half of the tube sheet, so that considerable stresses are produced which increase with increasing diameter of the tube sheet. The water that is to be vaporized flows outside the tube bundle in accordance with a natural circulatory system. Other heretofore known steam generators have straight or step-shaped tubes and pressurized water inlet and outlet chambers that are located at opposite ends of the steam generator so that no stresses occur within the tube sheet. The heating surfaces in such heretofore known steam generators are of such dimension that slightly superheated steam is produced and, consequently, water separators are not required.

In German Published Non-Prosecuted Patent Application DOS 2 122 837, a heat exchanger of the foregoing type is described wherein the tubes are bent into a stepped shape so as to avoid the occurrence of stresses between the housing and the tube bundle.

It is an object of the invention of the instant application to provide a steam generator assembly for pressurized water nuclear reactors with straight tubes wherein, not only during the continuous operation thereof but also at start-up of the operation, only slight differences in temperature occur between the tube bundle and the housing, so that special measures or structural features for equalizing different temperature-expansions can be largely dispensed with. More specifically, it is an object of the invention to provide such a steam generator assembly wherein the essential temperature differences are adjusted during start-up of the operation and are at their greatest in the lower region of the steam generator into which the undercooled feedwater is introduced.

With the foregoing and other objects in view, there is provided, in accordance with the invention, a steam generator assembly for pressurized water reactors having a housing surrounding a straight tube bundle traversible by pressurized water and having connected to a pressurized water inlet chamber and a pressurized water outlet chamber, respectively, at opposite ends thereof, the foregoing having an inlet and an outlet for feedwater flowing into and out of the housing over the tube bundle and being vaporized and slightly superheated in a single pass therethrough, comprising two pressurized water outlet lines of relatively smaller and larger diameter respectively, extending from the outlet chamber, a partial flow preheater for the feed water heatable by pressurized water connected to the outlet line of relatively smaller diameter, the partial flow preheater having a pressurized water outlet line, and a control valve connected in the pressurized water outlet line of the partial flow preheater for controlling the pressurized water flow through the partial flow preheater so as to effect maximal preheating of feedwater therein up to substantially vaporization temperature thereof.

Through the use of such a partial preheater separated from the steam generator proper, the problem of stresses produced in the steam generator proper for a pressurized water reactor is considerably reduced without requiring an increase in the dimensions of the partial flow preheater because it is traversed only by a small part of the pressurized water flowing through the steam generator proper.

Other features which are considered as characteristic for the invention are set forth in the appended claims.

Although the invention is illustrated and described herein as steam generator assembly for pressurized water reactors with a straight tube bundle and a partial flow preheater traversible by pressurized water, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the single FIGURE of the drawing which is a schematic view, partly diagrammatic and partly in section, of the steam generator assembly of the invention.

Referring now to the drawing, there is shown a preferred embodiment of the steam generator assembly of the invention, which includes a steam generator per se or heat exchanger having a housing 1 from which a pressurized water inlet tube 2 extends, through which pressurized water heated in a non-illustrated nuclear reactor flows in direction of the arrow located at the top of the FIGURE of the drawing into a pressurized water inlet chamber 3. From the latter, the pressurized water flows into the interior of the tubes 4 of a tube bundle. The tubes 4 extend rectilinearly in the housing from the top to the bottom thereof, as shown in the FIGURE and terminate at the bottom end of the housing 1 in a pressurized water outlet chamber 5. The pressurized water outlet chamber 5 is provided with connections for two pressurized water outlet lines 6 and 7. The pressurized water outlet line 7 extends to and is connected with a partial flow preheater 8, which can have a construction similar to that of the steam generator per se or heat exchanger which has the housing 1, and is, in turn, provided with a housing 9 with straight or rectilinearly extending tube bundles 10 located therewithin. The partial flow preheater 8 can also be constructed with a U-shaped tube bundle, because generally no undue thermal stresses would be produced in the tube sheet thereof due to the relatively small diameter of the preheater and of the tube bundle. After the pressurized water has flowed through the partial flow preheater 8 from the pressurized water inlet line 7, it passes through a connecting line 11, in which a control valve 12 is connected, to an ejector 13 which is, in turn, connected in the pressurized water outlet line 6, and assures that an adequate partial flow of pressurized water will pass through the partial flow preheater 8, which can be controlled by the control partial flow preheater 8, which can be controlled by the control valve 12.

In accordance with the invention, the control valve 12 can be load-dependently regulated so that in the partial flow preheater 8, on the one hand, no vaporization or steam-formation of the feedwater occurs but, on the other hand, the temperature of the feedwater is increased substantially to vaporization temperature. The feedwater travels, after conventional regenerative preheating, through a feedwater inlet line 14, in which a feedwater valve 15 is connected, into the partial flow preheater 8, flows around the tube bundle 10 therein, and discharges from the partial flow preheater 8 through feedwater lines 16 and 17 which terminate in the housing 1 of the steam generator proper. In the space within the housing 1 surrounding the tube bundle 4, the feedwater entering through the lines 16 and 17 is vaporized and is discharged from the steam generator per se through outlet connectors 18 and 19 from which it is conducted to non-illustrated turbines of a nuclear power plant, for example. In the upper part of the tube bundle 4, as viewed in the FIGURE, guide plates 20 are mounted for improving heat transfer in the vapor or steam region of the steam generator proper. In the middle of the housing 1, there is furthermore provided a separator 21 for salt-bearing water accumulating in the remainder vaporizing zone. The separator 21 is connected with an outlet tube 22 extending along the axis of the housing 1, through which the salt-containing water can be discharged through control by a valve 23 connected thereto.

I claim:

1. Steam generator assembly for pressurized water reactors having a housing surrounding a straight tube bundle traversible by pressurized water and connected to a pressurized water inlet chamber and a pressurized water outlet chamber, respectively, at opposite ends thereof, the housing having an inlet and an outlet for feedwater flowing into and out of the housing over the tube bundle and being vaporized and slightly superheated in a single pass therethrough, comprising two pressurized water outlet lines of relatively smaller and larger diameter, respectively, extending from the outlet chamber, a partial flow preheater for the feedwater heatable by pressurized water connected to the outlet line of relatively smaller diameter, said partial flow preheater having a pressurized water outlet line, and a control valve connected in said pressurized water outlet line of said partial flow preheater for controlling the pressurized water flow through said partial flow preheater so as to effect maximal preheating of feedwater therein up to substantially vaporization temperature thereof.

2. Steam generator assembly according to claim 1 including an ejector connected in said pressurized water outlet line of said preheater for increasing flow of pressurized water through said partial flow preheater.

3. Steam generator assembly according to claim 1 including a housing wherein the straight tube bundle is substantially vertically disposed, a remainder vaporizing zone being located at an upper region of said housing, a separator for accumulating salt-containing water drops located at the substantially vertical axis of said housing in vicinity of said remainder vaporizing zone, said separator having an outlet tube coextensive with said substantially vertical axis of said housing.

* * * * *